United States Patent [19]

Liimatta et al.

[11] Patent Number: 5,173,367

[45] Date of Patent: Dec. 22, 1992

[54] CERAMIC COMPOSITES

[75] Inventors: Eric W. Liimatta; William E. Moehle, both of Baton Rouge; Conrad J. Langlois, Jr., New Roads, all of La.

[73] Assignee: Ethyl Corporation, Richmond, Va.

[21] Appl. No.: 647,532

[22] Filed: Jan. 15, 1991

[51] Int. Cl.$^5$ ............................. B32B 9/00; C06K 3/28
[52] U.S. Cl. ..................................... 428/408; 428/446; 428/608; 524/424; 524/439; 524/592; 106/287.23
[58] Field of Search ............... 428/608, 408, 446, 447; 524/404, 424, 439, 588, 592; 106/287.23

[56] References Cited

U.S. PATENT DOCUMENTS 4,973,526 11/1990 Haluska ................................ 428/697
5,041,337 8/1991 Niebylski ............................ 428/446

Primary Examiner—Peter A. Nelson
Attorney, Agent, or Firm—Patricia J. Hogan

[57] ABSTRACT

Fiber-reinforced ceramic composites are obtained by the use of a prepreg comprising sized carbon fibers bonded together with a matrix composition which comprises about 25-60% by weight of a polysilazane and about 75-40% by weight of at least two ceramic powders selected from silicon metal, silicon carbide and silicon boride powders.

18 Claims, No Drawings

CERAMIC COMPOSITES

FIELD OF INVENTION

This invention relates to fiber-reinforced ceramic composites and especially to prepregs useful in preparing them.

BACKGROUND

Fiber-reinforced ceramic composites are materials which have many utilities and are used, e.g., for aeronautical applications, radomes, draw rollers for synthetic filaments, and tools. Fibers which have been utilized in the preparation of the composites include carbon fibers, sized carbon fibers, and silicon carbide fibers; and polysilazane compositions, such as those of U.S. Pat. No. 4,482,669 (Seyferth et al.-I), have been taught to be useful in preparing the ceramic matrices.

When producing a fiber-reinforced ceramic composite, it is convenient to coat loose or woven fibers with a solution or dispersion of a preceramic material, dry the coating to bond the fibers together with a matrix and form a prepreg, laminate layers of the prepreg, and heat the resultant laminate to pyrolyze the matrix. The porous composite thus formed can then be infiltrated with a preceramic composition, if desired, and subjected to pyrolysis to form a denser composite having increased strength.

Copending applications S N. (Case CE-6102-B) (Yu et al.) and S. N. (Case CE-6294) (Liimatta et al.) teach crosslinkable preceramic polysilazane/unsaturated compound blends which are useful as infiltrants for fiber-reinforced ceramic composites, as well as dispersions of ceramic powders in such blends which can be employed in forming the matrices. In Yu et al. the polysilazane is a mixture of low and medium molecular weight polysilazanes, while the polysilazane of Liimatta et al. is a low molecular weight polysilazane; and the unsaturated component of each of the compositions is an organic or organosilicon compound containing at least two alkenyl groups.

U.S. Pat. Nos. 4,904,818 (Minami et al.) and 4,923,752 (Cornelia) disclose the utility of a bisphenol/polyalkylene etherester copolymer and a fluorinated poly(amide-acid), respectively, as sizing agents which improve the handleability of carbon fibers used in preparing carbon fiber-reinforced plastics. Copending application Ser. No. 07/301,451 (Niebylski-I) teaches that a trialkoxy-, triaryloxy-, or tri(arylalkoxy)boroxine, preferably in conjunction with a strong acid, can be used to size carbon fibers and protect them from mechanical damage and oxidative deterioration in the preparation and use of fiber-reinforced composites.

Copending application Ser. No. 07/446,184 (Niebylski-II) discloses coating compositions which are especially valuable in forming buffer layers in multilayer ceramic coatings and which comprise mixtures of Group IIIB and IVA metal hydrocarbyloxides; a bis-, tris-, or tetrakis(dialkylamino)metal of Group IVA; a polysilazane and/or a bis-, tris-, or tetrakis(dialkylamino)silane; and optional cyclopentadienyl Group IVA metal halide.

The teachings of copending application Ser. No. 07/466,622 (Niebylski-III) relate to compositions which are particularly useful for coating normally oxidizable substrates and which comprise dispersions of silicon metal, silicon boride, and optional aluminum-silicon eutectic and/or silicon carbide in polysilazane solutions.

SUMMARY OF INVENTION

It has now been found that fiber-reinforced ceramic composites having good oxidation resistance can be obtained by the use of a prepreg comprising sized carbon fibers bonded together with a matrix composition which comprises about 25-60% by weight of a polysilazane and about 75-40% by weight of at least two ceramic powders selected from silicon metal, silicon carbide, and silicon boride powders.

DETAILED DESCRIPTION

As in the preparation of conventional prepregs, the carbon fibers employed in the practice of the invention may be loose or woven, but it is generally preferred that they be the woven fibers of a mat.

When the fibers are not to be subjected to conditions that could cause oxidative deterioration, the sizings with which they are protected may be any conventional sizings that protect them from mechanical damage during handling, such as the aforementioned sizings of Minami et al. and Cornelia, the teachings of both of which are incorporated herein by reference. However, when oxidative deterioration might occur, it is preferred that the sizing be one which provides some protection from such deterioration, e.g., the sizings of Niebylski-I, the teachings of which are also incorporated herein by reference.

Preferred sizing materials are the neoalkoxy aminoorganotitanates and zirconates of U.S. Pat. No. 4,657,988 (Sugerman et al.) and the Group IIIB and IVA metal hydrocarbyloxides; bis-, tris-, and tetrakis(dialkylamino)metals of Group IVA; polysilazanes; bis-, tris-, and tetrakis(dialkylamino)silanes; and cyclopentadienyl Group IVA metal halides of Niebylski-II, the teaching of both of which are incorporated herein by reference. When used, these preferred sizing materials may be employed separately, or any two or more of them may be utilized in combination; and they may be applied to the carbon fibers so as to form one or more layers.

Exemplary of the preferred sizing materials are aluminum sec-butoxide, zirconium propoxide, tetrakis(diethylamino)titanium, 2,2-di(allyloxymethyl)butyl tris[N-2-aminoethyl)-2-aminoethyl]-titanate, 2,2-di(allyloxymethylbutyl tris(2-[2-(dimethylamino)-ethoxy]ethyl)-titanate, bis(cyclopentadienyl)zirconium dichloride, and polysilazanes preparable by reacting methyldichlorosilane with ammonia and polymerizing the ammonolysis product with the potassium hydride.

Particularly preferred sized carbon fibers for use in the practice of the invention constitute a mat of carbon fibers having a two-layer size obtained by (A) first sizing the fibers in the mat with an organic solvent solution of a mixture of 20-30% by weight of aluminum sec-butoxide, 20-30% by weight of zirconium propoxide, 20-30% by weight of a polysilazane, and 1-15% by weight of tetrakis(diethylamino)titanium or 2,2-di(allyloxymethyl)butyl tris[N-(2-aminoethyl)-2-aminoethyl]titanate and (B) then sizing them with an organic solvent solution of a polycarbosilane or polysilazane, both polysilazanes being of the preferred type described above.

Since the particular solvents used for the sizing materials are not critical, they are generally common organic solvents, such as hexane, heptane, benzene, toluene, xylene, diethyl ether, tetrahydrofuran, glyme, diglyme, cyclohexanone, 1-methyl-2-pyrrolidone, and the like—solvents that are also useful in preparing the matrix compositions.

The polysilazane component of the composition used to form the matrix may be any polysilazane that is soluble in common organic solvents; and it may be, e.g., a polysilazane of Seyferth et al.-I or any of U.S. Pat. Nos. 4,645,807 (Seyferth et al.-II), 4,650,837 (Seyferth et al.-III), and 4,659,850 (Arai et al.), the teachings of all of which are incorporated herein by reference. However, it is preferably a polysilazane of Seyferth et al.-I, such as the polysilazanes mentioned above as sizing materials and other polysilazanes prepared by reacting an organodihalosilane with ammonia and polymerizing the ammonolysis product with a basic deprotonation catalyst.

In the preparation of the matrix compositions, the polysilazane, when not already in solution form, is generally dissolved in a suitable solvent, optionally together with a polyisobutenyl succinimide or other dispersant, to facilitate dispersion of the ceramic powders therein.

The ceramic powders that are dispersed in the polysilazane are selected from silicon metal, silicon carbide, and silicon boride powders; and they may consist of mixtures of any two of these powders when mixtures of all three are not employed. When a silicon boride is one of the components of the mixture, it may be silicon hexaboride and/or silicon tetraboride. Two of the more preferred matrix compositions of the invention are (A) a composition comprising about 30% by weight of the polysilazane, about 35% by weight of silicon metal powder, and about 35% by weight of silicon hexaboride powder and (B) a composition comprising about 45% by weight of a mixture of polysilazanes, about 1.4% by weight of silicon metal powder, about 1.4% by weight of silicon tetraboride powder, about 0.7% by weight of silicon hexaboride powder, and about 51.5% by weight of silicon carbide powder.

The prepregs of the invention are prepared by coating the sized carbon fibers with the matrix composition in any convenient manner, e.g., by painting the fibers with a brush or cloth or by dipping them in slurry obtained by dispersing the ceramic powders in the polysilazane solution, and then drying the coating to bond the fibers together with the matrix.

The prepregs are useful in forming fiber-reinforced ceramic composites which have particularly good oxidation resistance when the fibers have been sized with an oxidation-resistant coating of the preferred types disclosed above. In forming the composites, layers of the prepreg, usually after being cut into the same size, are laminated together, e.g., by stacking them and placing them in an autoclave in which they are heated under pressure, e.g., by heating them to 150° C. at a rate of 60° C./hour under vacuum in a vacuum bag with a nitrogen overpressure of about 1.4 MPa and holding them at 150° C. for about 15 minutes before cooling them at a rate of 120° C./hour to form a composite in which the matrix is a ceramic containing silicon nitride derived from the polysilazane as well as other components which vary with the particular ceramic powders included in the matrix-forming composition.

Like conventional fiber-reinforced ceramic composites, those formed from the prepregs of the invention are typically porous materials which are tougher than the corresponding ceramics having no fiber reinforcement and can be made stronger by infiltrating them to produce composites densified with interspersed areas of a ceramic derived from the infiltrant.

When it is desired to densify the porous composites prepared from the novel prepregs, the infiltrant may be a conventional infiltrant, such as a polysilazane of Seyferth et al.-I. However, densified composites are preferably obtained by employing an infiltrant composition of Yu et al. or Liimatta et al., the teachings of each of which are incorporated herein by reference.

The infiltrants of Yu et al. and Liimatta et al. are crosslinkable preceramic polysilazane/unsaturated compound blends in which the unsaturated compound is an organic or organosilicon compound containing at least two alkenyl groups, preferably a compound in which the alkenyl groups are alkenyl groups containing 2–6 carbons, such as substituted and unsubstituted vinyl, allyl, and 3-butenyl groups. Such compounds include divinylbenzene, polybutadienes having a high 1,2-content, and other such organic compounds; but they are preferably organosilicon compounds, especially organosilicon compounds corresponding to the formula:

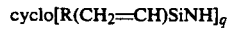

$$\text{cyclo}[R(CH_2=CH)SiNH]_q$$

in which R is a substituted or unsubstituted alkyl group containing 1–6 carbons or a substituted or unsubstituted aryl group containing 6–10 carbons, and q is at least 2. Of these preferred compounds those which are most preferred are the compounds in which R is methyl and q is at least 3, including mixtures thereof, e.g., methylvinylcyclosilazane.

The polysilazane of the infiltrant compositions may be any suitable polysilazane having an appropriate molecular weight, e.g., a polysilazane of Seyferth et al.-I, -II, or -III, Arai et al., or U.S. Pat. No. 4,297,828 (Seyferth et al.-IV). However, it is preferably a polysilazane of Seyferth et al.-I; and regardless of its particular type, it must be a low molecular weight polysilazane or a mixture of low and medium molecular weight polysilazanes. The preferred low and medium molecular weight polysilazanes are ones which have respective relative viscosities of 1.12–1.16 and 1.3–1.4, measured as solutions of 5% by weight of the polymers in tetrahydrofuran.

The infiltrants of Yu et al. comprise about 40–70% by weight of a low molecular weight polysilazane, about 15–35% by weight of a medium molecular weight polysilazane, and about 5–30% by weight of the unsaturated compound, while the infiltrants of Liimatta et al. comprise about 75–99% by weight of a low molecular weight polysilazane and about 1–25% by weight of the unsaturated compound.

When porous composites formed from the prepregs of the invention are to be densified, they are usually immersed in a melt or solution of the infiltrant, e.g., a solution in one of the common organic solvents mentioned above; and the infiltration is effected under suitable temperature and pressure conditions. Both melt and solution infiltrations can be conducted without added pressure; but the use of superatmospheric pressures, generally pressures in the range of about 1.4–14 MPa, increases the efficiency of the infiltration. Melt infiltrations are ordinarily conducted at a temperature of at least about 100° C., e.g., at about 100–300° C.—temperatures which are also suitable for solution infiltrations. However, solution infiltrations may also be accomplished at lower temperatures, e.g., room temperature.

Both melt and solution infiltrations may be facilitated by the use of vacuum infiltration—a technique in which air is pumped from the pores of the composite before it is immersed in the infiltrant.

After infiltration has been effected, the composite is recovered and heated, usually at a temperature of at least about 850° C., e.g., 850–1400° C., to pyrolyze the infiltrant.

The infiltration/pyrolysis procedure results in the formation of a ceramic composite which has been rendered less porous by the formulation of interspersed areas of ceramic derived from the infiltrant and which is therefore both denser and stronger than the original porous composite, and it can be repeated one or more times to incorporate more infiltrant when greater densification is desired.

The following examples are given to illustrate the invention and are not intended as a limitation thereof. Unless otherwise specified, quantities mentioned in the examples are quantities by weight.

In these examples, the polysilazanes are products obtained by reacting methyldichlorosilane with ammonia and polymerizing the ammonolysis product with potassium hydride, as in Seyferth et al.-I; those described as having low or medium molecular weights are polymers having relative viscosities of 1.12–1.16 or 1.3–1.4, respectively, measured as solutions of 5% by weight of the polymers in tetrahydrofuran; and those undefined as to their molecular weights are soluble polymers having somewhat higher relative viscosities.

PREPARATION OF MATRIX COMPOSITIONS

EXAMPLE I

Part A

Prepare Matrix Composition A by dispersing 35 parts of silicon hexaboride and 35 parts of silicon metal in a solution of 30 parts of polysilazane in 30 parts of xylene.

Part B

Prepare Matrix Composition B by intimately mixing (A) 0.2 part of silicon metal, (B) 0.2 part of silicon tetraboride, (C) 0.1 part of silicon hexaboride, (D) 6.6 parts of a 61% solution of 24 parts of a low molecular weight polysilazane, 10 parts of a medium molecular weight polysilazane, six parts of methylvinylcyclosilazane, and two parts of azobisisobutyronitrile in toluene, and (E) 9.5 parts of a 75/25 mixture of silicon carbide and polysilazane to form a slurry having a ceramic powder/polysilazane ratio of about 55/45.

PREPARATION OF COMPOSITES

EXAMPLE II

Part A

Sequentially size the fibers in a carbon fiber mat with (A) a 20% solution of 25 parts of aluminum sec-butoxide, 25 parts of zirconium propoxide, 25 parts of polysilazane, and 12.5 parts of 2,2-di(allyloxymethyl)-butyl tris[N-(2-aminoethyl)-2-aminoethyl]titanate in xylene and (B) a 10% solution of polysilazane in xylene, pyrolyzing each layer of the size at 875° C. after drying.

Part B

Paint Matrix Composition A onto the sized carbon fiber mat of Part A and allow the painted fibers to dry in an inert atmosphere to form a prepreg. Cut the prepreg into uniform pieces and stack five pieces together with a drop of a 40% solution of polysilazane in xylene between each piece and the piece above it. Then uniaxially press the stack to laminate the pieces together and heat the laminate at 875° C. to pyrolyze the matrix.

Part C

Infiltrate the pores of the composite of Part B by immersing the composite in a 40% solution of polysilazane in xylene and effecting infiltration at a nitrogen overpressure of 227 kPa. After removing the infiltrated composite from the polymer solution, heat it at 130–220° C. for 20 minutes to crosslink the infiltrant and then at 875° C. to effect pyrolysis. Repeat the infiltration, crosslinking, and pyrolysis ten times.

EXAMPLE III

Part A

Size the fibers in a carbon fiber mat with a 35% solution of 25 parts of aluminum sec-butoxide, 25 parts of zirconium propoxide, 25 parts of polysilazane, and 12.5 parts of tetrakis(diethylamino)titanium in xylene. Pyrolyze the size at 1000° C., and then size with a 4.7% solution of polycarbosilane in xylene and pyrolyze at 1300° C.

Part B

Paint Matrix Composition B onto the sized carbon fiber mat of Part A and allow the painted fibers to dry in an inert atmosphere to form a prepreg. Cut the prepreg into uniform pieces, stack five pieces together, and uniaxially press the stack while heating to 70° C. to laminate the pieces together. Then heat the laminate to 1300° C. to pyrolyze the matrix.

Part C

Infiltrate the pores of the composite of Part B by immersing the composite in a melt of a low molecular weight polysilazane after pumping the air from its pores and heating the composite at 110 C and then effecting infiltration under a nitrogen overpressure of 1.7 MPa while the temperature is ramped to 180° C. Recover the composite, heat from room temperature to 300° C. under nitrogen to crosslink the infiltrant, and pyrolyze at 875° C. Repeat the infiltration/pyrolysis procedure five times.

PREPARATION OF COATING COMPOSITIONS

EXAMPLE IV

Part A

Prepare a primer composition by mixing 3–5 cc of a 1.9 M solution of HF in ethanol, 3 cc of xylene, and 3 cc of isopropanol with 100g of trimethoxyboroxine.

Part B

Prepare an organoborosilazane polymer solution identified as TB by allowing four parts of trimethoxyboroxine to react with one part of polysilazane in xylene to form a 60% solution.

Part C

Prepare an organoborosilazane polymer dispersion identified as TBS by dispersing a 1/1/0.2 mixture of amorphous silicon metal, silicon hexaboride, and barium fluoride in TB to provide 45% dispersed solids.

Part D

Prepare a buffer composition identified as QS by dissolving 25 parts of zirconium propoxide, 25 parts of aluminum sec-butoxide, 25 parts of polysilazane, and 12.5 parts of tetrakis(diethylamino)titanium in 37.5 parts of xylene and dispersing a 3/1 mixture of amorphous silicon metal and silicon tetraboride in the resultant solution to provide 20-35% dispersed solids.

Part E

Prepare a polysilazane solution identified as T by dissolving 40 parts of polysilazane in 60 parts of xylene.

Part F

Prepare a polysilazane dispersion identified as TS by dispersing a 1/1/0.5 mixture of amorphous silicon metal, silicon tetraboride, and silicon hexaboride in T to provide 33-35% dispersed solids.

COATING OF COMPOSITES

EXAMPLE V

Prime the infiltrated composite of Example II with the primer composition of Example IV, Part A, and then successively coat the primed composite with the TB and TBS compositions, applying each of the compositions in multiple layers which are dried before the application of the next layer, and pyrolyzing the multiple layers of the same composition together.

After pyrolyzing the TBS layers, apply at least one layer of QS, dry the coating, apply at least one layer of T, and dry and pyrolyze the coating. Then successively apply, dry, and pyrolyze the TS and T compositions, providing at least one layer of each composition.

When composites prepared as in Example V were tested to determine their resistance to oxidative deterioration as elevated temperatures, no composite failed the test using the McAir Cycle prior to 750 hours, and one composite still had not failed the test when it was terminated at 1500 hours. Using a constant 1425° C. test, no composite failed prior to 600 hours, and one composite still had not failed the test when it was terminated at 900 hours.

The test using the McAir Cycle involved subjecting the composite to four cycles of 815° C. for 12 minutes, 1425° C. for six minutes, 815° C. for 12 minutes, and room temperature for two minutes and then heating it at 650° C. for 16 hours.

What is claimed is:

1. A prepreg comprising sized carbon fibers bonded together with a matrix composition which comprises about 25-60% by weight of a polysilazane and about 75-40% by weight of at least two ceramic powders selected from silicon metal, silicon carbide, and silicon boride powders.

2. The prepreg of claim 1 wherein the carbon fibers are sized with at least one layer of a material that improves their oxidation resistance.

3. The prepreg of claim 2 wherein the carbon fibers are sized with a composition comprising at least one material selected from Group IIIB and IVA metal hydrocarbyloxides; bis-, tris-, and tetrakis(dialkylamino)metals of Group IVA; neoalkoxy aminoorganotitanates and zirconates; polysilazanes; bis-, tris-, and tetrakis(dialkylamino)silanes; and cyclopentadienyl Group IVA metal halides.

4. The prepreg of claim 3 wherein the carbon fibers are a mat of carbon fibers having a two-layer size obtained by (A) first sizing the fibers in the mat with a mixture of 20-30% by weight of aluminum sec-butoxide, 20-30% by weight of zirconium propoxide, 20-30% by weight of a polysilazane, and 1-15% by weight of tetrakis(diethylamino)titanium or 2,2-di(allyloxymethyl)butyl tris[N-(2-aminoethyl)-2-aminoethyl]titanate and (B) then sizing them with a polycarbosilane or polysilazane, both polysilazanes being polymers preparable by reacting methyldichlorosilane with ammonia and polymerizing the ammonolysis product with potassium hydride.

5. The prepreg of claim 4 wherein the matrix composition comprises about 30% by weight of polysilazane which is preparable by reacting methyldichlorosilane with ammonia and polymerizing the ammonolysis product with potassium hydride, about 35% by weight of silicon metal powder, and about 35% by weight of silicon hexaboride powder.

6. The prepreg of claim 4 wherein the matrix composition comprises about 45% by weight of at least one polysilazane which is preparable by reacting methyldichlorosilane with ammonia and polymerizing the ammonolysis product with potassium hydride, about 1.4% by weight of silicon metal powder, about 1.4% by weight of silicon tetraboride powder, about 0.7% by weight of silicon hexaboride powder, and about 51.5% by weight of silicon carbide powder.

7. A process for preparing a prepreg which comprises (A) coating sized carbon fibers with a dispersion of about 40-75 parts by weight of at least two ceramic powders selected from silicon metal, silicon carbide, and silicon boride powders in an organic solvent solution containing, respectively, about 60-25 parts by weight of a polysilazane and (B) drying the coating to bond the fibers together.

8. The process of claim 7 wherein the carbon fibers are a mat of carbon fibers having a two-layer size obtained by (A) first sizing the fibers in the mat with an organic solvent solution of a mixture of 20-30% by weight of aluminum sec-butoxide, 20-30% by weight of zirconium propoxide, 20-30% by weight of a polysilazane, and 1-15% by weight of tetrakis(diethylamino)titanium or 2,2-di(allyloxymethyl)butyl tris[N-(2-aminoethyl)-2-aminoethyl]titanate, (B) drying the size, (C) sizing the thus-sized fibers with an organic solvent solution of a polycarbosilane or polysilazane, and (D) drying and pyrolyzing the size, both polysilazanes being polymers preparable by reacting methyldichlorosilane with ammonia and polymerizing the ammonolysis product with potassium hydride.

9. The process of claim 8 wherein the dispersion with which the sized carbon fibers are coated is a dispersion comprising about 30 parts by weight of a polysilazane which is preparable by reacting methyldichlorosilane with ammonia and polymerizing the ammonolysis product with potassium hydride, about 35 parts by weight of silicon metal powder, and about 35 parts by weight of silicon hexaboride powder.

10. The process of claim 8 wherein the dispersion with which the sized carbon fibers are coated is a dispersion comprising about 45% by weight of at least one polysilazane which is preparable by reacting methyldichlorosilane with ammonia and polymerizing the ammonolysis product with potassium hydride, about 1.4% by weight of silicon metal powder, about 1.4% by weight of silicon tetraboride powder, about 0.7% by weight of silicon hexaboride powder, and about 51.5% by weight of silicon carbide powder.

11. A fiber-reinforced ceramic composite comprising carbon fibers bonded in a silicon nitride-containing ceramic matrix and prepared by laminating layers of the prepreg of claim 1 and heating the resultant laminate at a temperature of at least 850° C. to pyrolyze the matrix.

12. A fiber-reinforced ceramic composite comprising carbon fibers bonded in a silicon nitride-containing ceramic matrix and prepared by laminating layers of the prepreg of claim 2 and heating the resultant laminate at a temperature of at least 850° C. to pyrolyze the matrix.

13. A fiber-reinforced ceramic composite comprising carbon fibers bonded in a silicon nitride-containing ceramic matrix and prepared by laminating layers of the prepreg of claim 3 and heating the resultant laminate at a temperature of at least 850° C. to pyrolyze the matrix.

14. A fiber-reinforced ceramic composite comprising carbon fibers bonded in a silicon nitride-containing ceramic matrix and prepared by laminating layers of the prepreg of claim 4 and heating the resultant laminate at a temperature of at least 850° C. to pyrolyze the matrix.

15. A fiber-reinforced ceramic composite comprising carbon fibers bonded in a silicon nitride-containing ceramic matrix and prepared by laminating layers of the prepreg of claim 5 and heating the resultant laminate at a temperature of at least 850° C. to pyrolyze the matrix.

16. A fiber-reinforced ceramic composite comprising carbon fibers bonded in a silicon nitride-containing ceramic matrix and prepared by laminating layers of the prepreg of claim 6 and heating the resultant laminate at a temperature of at least 850° C. to pyrolyze the matrix.

17. The fiber-reinforced ceramic composite of claim 11 densified with interspersed areas of a ceramic derived by pyrolyzing a crosslinkable preceramic composition comprising about 75–99% by weight of a low molecular weight polysilazane and about 1–25% by weight of an unsaturated organic or organosilicon compound containing at least two alkenyl groups at a temperature of at least 850° C.

18. The fiber-reinforced ceramic composite of claim 11 densified with interspersed areas of a ceramic derived by pyrolyzing a crosslinkable preceramic composition comprising about 40–70% by weight of a low molecular weight polysilazane, about 15–35% by weight of a medium molecular weight polysilazane, and about 5–30% by weight of an unsaturated organic or organosilicon compound containing at least two alkenyl groups at a temperature of at least 850° C.

* * * * *